United States Patent
Choi et al.

(10) Patent No.: US 8,705,430 B2
(45) Date of Patent: Apr. 22, 2014

(54) MBS DATA TRANSMISSION METHOD, BASE STATION, MBS DATA RECEIVING METHOD, AND USER EQUIPMENT

(75) Inventors: Jin Soo Choi, Anyang-si (KR); Han Gyu Cho, Anyang-si (KR); Jin Sam Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 104 days.

(21) Appl. No.: 13/518,834

(22) PCT Filed: Jan. 3, 2011

(86) PCT No.: PCT/KR2011/000008
§ 371 (c)(1),
(2), (4) Date: Jun. 22, 2012

(87) PCT Pub. No.: WO2011/083942
PCT Pub. Date: Jul. 14, 2011

(65) Prior Publication Data
US 2012/0294221 A1 Nov. 22, 2012

Related U.S. Application Data

(60) Provisional application No. 61/294,104, filed on Jan. 11, 2010.

(30) Foreign Application Priority Data

Dec. 14, 2010 (KR) .................. 10-2010-0127460

(51) Int. Cl.
*H04W 4/00* (2009.01)
*H04W 72/00* (2009.01)
*H04W 84/04* (2009.01)

(52) U.S. Cl.
CPC ............ *H04W 72/005* (2013.01); *H04W 84/04* (2013.01)

USPC ............ 370/312; 370/329; 455/450; 455/446

(58) Field of Classification Search
CPC . H04W 72/04; H04W 72/044; H04W 72/046; H04W 76/021; H04W 72/005
USPC .......... 370/312, 328, 329, 431; 455/446, 450, 455/464

See application file for complete search history.

(56) References Cited

U.S. PATENT DOCUMENTS

| | | | |
|---|---|---|---|
| 2006/0239264 A1 | 10/2006 | Kang et al. | |
| 2008/0146213 A1 | 6/2008 | Kim et al. | |
| 2011/0058511 A1* | 3/2011 | Kim et al. | ..... 370/312 |
| 2011/0058512 A1 | 3/2011 | Koo et al. | |
| 2011/0188436 A1* | 8/2011 | Damnjanovic et al. | ....... 370/312 |
| 2011/0305185 A1* | 12/2011 | Kwon et al. | .................. 370/312 |
| 2012/0082052 A1* | 4/2012 | Oteri et al. | .................... 370/252 |

FOREIGN PATENT DOCUMENTS

| | | |
|---|---|---|
| KR | 10-2006-111864 A | 10/2006 |
| KR | 10-2008-0034641 A | 4/2008 |
| KR | 10-2009-0093760 A | 9/2009 |

* cited by examiner

*Primary Examiner* — Paul H Masur
*Assistant Examiner* — Michael Phillips
(74) *Attorney, Agent, or Firm* — Birch, Stewart, Kolasch & Birch, LLP

(57) ABSTRACT

The present invention relates to a method and apparatus for signaling, to user equipment, the number and position of frequency resources allocated to each of the plurality of E-MBS zones, using a zone allocation bitmap including bits corresponding to the number of resources allocated for one or more E-MBS zones. The method and apparatus of the present invention are advantageous in that signaling overheads required for specifying the number and position of frequency resources allocated to each of E-MBS zones can be reduced.

20 Claims, 8 Drawing Sheets

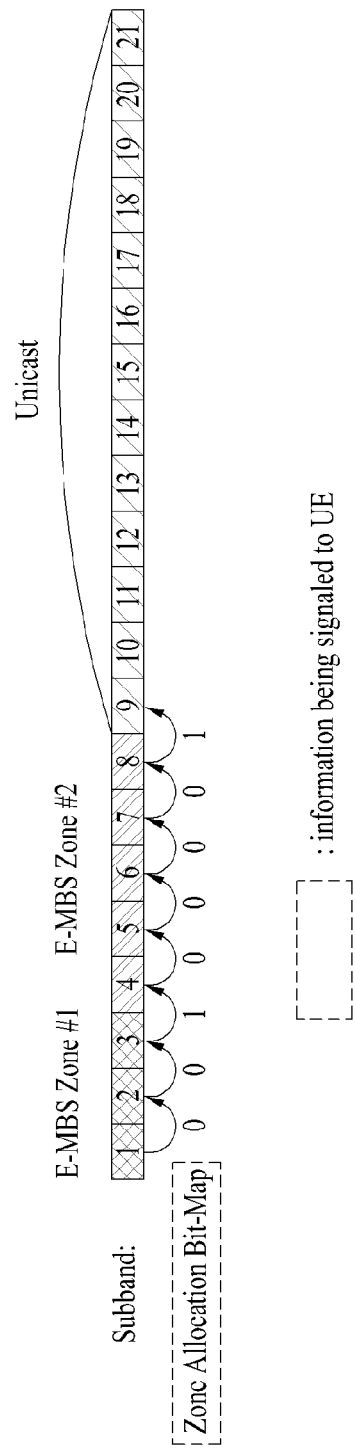

MBS DATA TRANSMISSION METHOD, BASE STATION, MBS DATA RECEIVING METHOD, AND USER EQUIPMENT

This application is the National Phase of PCT/KR2011/000008 filed on Jan. 3, 2011, which claims priority under 35 U.S.C. 119(e) to U.S. Provisional Application No. 61/294,104 filed on Jan. 11, 2010 and under 35 U.S.C. 119(a) to Patent Application No. 10-2010-0127460 filed in the Republic of Korea on Dec. 14, 2010, all of which are hereby expressly incorporated by reference into the present application.

FIELD OF THE INVENTION

The present invention relates to a wireless communication system, and more particularly, to MBS (multicast and broadcast service) transmission and reception.

BACKGROUND ART

In wireless communication system, data transmission services can be mainly classified into a multicast/broadcast service and a unicast service.

The unicast service is a sort of a point-to-point service for transmitting data to a single receiver from a single source. According to the unicast service, different data are transmitted to different receivers or receiver groups on different radio resources, respectively.

The multicast/broadcast service (hereinafter abbreviated MBS) is a sort of a point-to-multipoint service for transmitting data to a plurality of receivers from a single source. According to the MBS, the same data is transmitted to a plurality of receivers on a common radio channel for efficient use of radio resources.

In a general wireless access system, MBS may be mainly categorized into two types. In particular, a $1^{st}$ type corresponds to a single base station (single-BS) access. According to the single-B access, a service is provided by a single base station within a single cell. A $2^{nd}$ type corresponds to a multiple base station access (multi-BS access). According to the multi-BS access, several base stations configure a single MBS zone to provide MBS contents. Namely, an MBS service is provided in a manner that the same burst is allocated from an MBS server in a plurality of cells within the same MBS zone using a single MBS zone identifier (ID). Hence, in case of a BS included inter-cell movement, it may be able to obtain service continuity and macro-diversity gain without handover.

Meanwhile, for the variety and efficiency of a wireless communication service, it may be necessary to allow base stations belonging to different MBS zones to simultaneously transmit MBS data. And, it may be also necessary to allow a base station to simultaneously transmit MBS data and unicast data both. In particular, data having different properties or data of different types need to be transmitted in a manner of being multiplexed together. To this end, the demand for an efficient resource allocation method for transmitting MBS data in at least two MBS zones or both MBS data and unicast data is rising. Moreover, in order for a user equipment to receive data of different properties/types transmitted in a manner of being multiplexed together, the user equipment should be provided with allocation information on an MBS data carried resource per MBS zone and allocation information on a unicast data carried resource.

DETAILED DESCRIPTION OF THE INVENTION

Technical Objects

Accordingly, the present invention is directed to substantially obviate one or more problems due to limitations and disadvantages of the related art. First of all, an object of the present invention is to provide an apparatus for transmitting and receiving a multicast/broadcast signal in a wireless communication system and method thereof.

Another object of the present invention is to provide an apparatus for allocating a resource and method thereof, by which a plurality of signals having different properties or types can be efficiently multiplexed together.

A further object of the present invention is to provide a method and apparatus for efficiently configuring resource allocation information indicating a location and size of a resource to which a multicast/broadcast signal is allocated.

It is to be understood that technical objects to be achieved by the present invention are not limited to the aforementioned technical objects and other technical objects which are not mentioned will be apparent from the following description to the person with an ordinary skill in the art to which the present invention pertains.

Technical Solutions

To achieve these and other advantages and in accordance with the purpose of the present invention, as embodied and broadly described, the present invention discloses a method and apparatus for allocating frequency resources to at least one MBS zone in order from a logical frequency resource having a lowest index or a highest index.

Moreover, the present invention provides a method and apparatus for indicating a location and size of each of at least one MBS zone using a resource allocation bitmap constructed with bits set for each frequency resource unit of a prescribed unit.

In particular, the present invention provides a method and apparatus for signaling the number and positions of frequency resources allocated to each E-MBS zone using a zone allocation bitmap having a length corresponding to the number of resources allocated for at least one E-MBS zone.

To achieve these and other advantages and in accordance with the purpose of the present invention, a method of transmitting, by a base station, MBS (multicast and broadcast service) data in a wireless communication system, according to one embodiment of the present invention comprises: transmitting the MBS data via at least one subband allocated to an MBS zone, to which the base station belongs, from among at least one MBS zone to which n subbands are allocated starting with a subband of a lowest index from among a plurality of subbands included in a downlink frequency band; and transmitting n-bit allocation bitmap indicating whether a usage of a subband is identical to that of a subband next to the subband for the n subbands.

To achieve these and other advantages and in accordance with the purpose of the present invention, a method of receiving, by a user equipment, MBS (multicast and broadcast service) data in a wireless communication system, according to another embodiment of the present invention comprises: receiving an allocation bitmap from a base station; receiving the MBS data via a subband allocated to an MBS zone, to which the user equipment belongs, from among n subbands allocated to at least one MBS zone using the allocation bitmap, wherein the n subbands are subbands corresponding to n lowest indexes from among a plurality of subbands included in a downlink frequency band and wherein the allocation bitmap comprises n bits set to indicate whether a usage of a subband among the n subbands is identical to that of a subband next to the subband.

To achieve these and other advantages and in accordance with the purpose of the present invention, a base station of transmitting MBS (multicast and broadcast service) data in a wireless communication system, according to still another embodiment of the present invention comprises: a transmitter configured to transmit the MBS data; and a processor, connected to the transmitter, configured to control the transmitter to transmit the MBS data via at least one subband allocated to an MBS zone, to which the base station belongs, from among at least one MBS zone to which n subbands are allocated starting with a subband of a lowest index from among a plurality of subbands included in a downlink frequency band, the processor configured to control the transmitter to transmit n-bit allocation bitmap indicating whether a usage of a subband is identical to that of a subband next to the subband for the n subbands.

To achieve these and other advantages and in accordance with the purpose of the present invention, a user equipment of receiving MBS (multicast and broadcast service) data in a wireless communication system, according to still another embodiment of the present invention comprises: a receiver configured to receive an allocation bitmap from a base station; and a processor, connected to the receiver, configured to control the receiver to receive the MBS data via a subband allocated to an MBS zone, to which the user equipment belongs, from among n subbands allocated to at least one MBS zone using the allocation bitmap, wherein the n subbands are subbands corresponding to n lowest indexes among a plurality of subbands included in a downlink frequency band and wherein the allocation bitmap comprises n bits set to indicate whether a usage of a subband among the n subbands is identical to that of a subband next to the subband.

According to the embodiments of the present invention, the rest of the plurality of subbands except the n subbands may be allocated to unicast data.

According to the embodiments of the present invention, in the allocation bitmap, a bit corresponding between two adjacent subbands allocated to different MBS zones or between a last subband of the n subbands and a $1^{st}$ subband of the rest of the plurality of subbands may be set to a $1^{st}$ value and a bit corresponding between two adjacent subbands allocated to a same MBS zone or between two subbands allocated to the unicast data may be set to a $2^{nd}$ value.

According to the embodiments of the present invention, the number of bits set to the $1^{st}$ value in the allocation bitmap may be equal to the number of the at least one MBS zone.

According to the embodiments of the present invention, the number of bits set to the $1^{st}$ value in the allocation bitmap may be smaller by one than a sum of the number of the at least one MBS zone and the number of zone for the unicast data, and information indicating a boundary between the at least one MBS zone and the unicast zone or information indicating the number of the at least one MBS zone may be transmitted from the base station to the user equipment.

The aforementioned technical solutions are only a part of the embodiments of the present invention, and various modifications to which technical features of the present invention are applied could be understood by the person with ordinary skill in the art to which the present invention pertains, based on the following detailed description of the present invention.

Effects of the Invention

Accordingly, the present invention may provide the following effects and/or features.

First of all, E-MBS data and unicast data can be transmitted by being multiplexed together.

Secondly, a size and position of a resource for E-MBS can be accurately represented.

Thirdly, singling overhead of information indicating a size and position of a resource for E-MBS can be reduced.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 8 shows one example of allocation of E-MBS zone and resource allocation information according to a $4^{th}$ embodiment of the present invention.

MODE FOR CARRYING OUT THE PRESENT INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Although the following description will be made based on a mobile communication system corresponding to an IEEE 802.16 system, the following description can be applied to other mobile communication systems except unique features of the IEEE 802.16 system.

Meanwhile, a multicast/broadcast service may be called MBMS (multimedia broadcast multicast service) in case of 3GPP ($3^{rd}$ generation partnership project) or MBS (multicast broadcast service) in case of IEEE 802.16. In the following description of this specification, the multicast/broadcast service may be commonly named an enhanced-multicast/broadcast (E-MBS).

In the present invention, a user equipment (UE) denotes a mobile or fixed type user terminal. Examples of the terminal equipment include various equipments that transmit and receive user data and/or various kinds of control information to and from a base station. The user equipment may be referred to as a terminal equipment (TE), a mobile station (MS), a mobile terminal (MT), a user terminal (UT), a subscriber station (SS), a wireless device, a personal digital assistant (PDA), a wireless modem, or a handheld device. Also, in the present invention, a base station (BS) means a fixed station that performs communication with a user equipment and/or another base station, and exchanges various kinds of data and control information with the user equipment and another base station. The base station may be referred to another terminology such as an evolved-NodeB (eNB), a base transceiver system (BTS), and an access point (AP).

Figure 1:
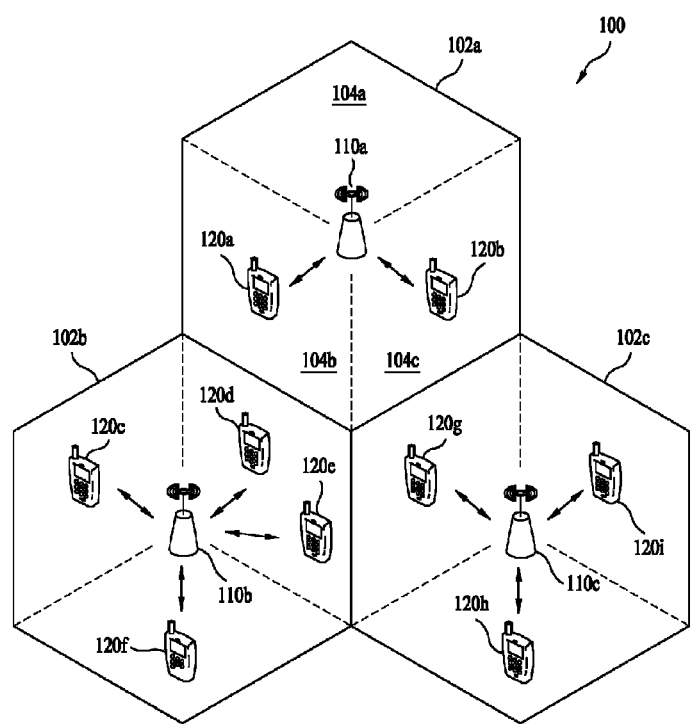
FIG. 1 shows one example of a wireless communication system.

FIG. 1 illustrates an example of wireless communication system. Referring to FIG. 1, a wireless communication system 100 includes a plurality of Base Stations (BSs) 110a, 110b and 110c and a plurality of User Equipments (UEs) 120a to 120i. The wireless communication system 100 may include homogeneous networks or heterogeneous networks. Heterogeneous networks refer to networks in which different network entities coexist, such as a WiFi, IEEE 802.16, LTE, etc. A BS is usually a fixed station that communicates with UEs. Each BS 110a, 110b or 110c provides services to its specific geographical area 102a, 102b or 102c. For the purpose of improving system performance, the specific service area of the BS may further be divided into a plurality of smaller areas 104a, 104b and 104c. These smaller areas may be called cells, sectors or segments. In an Institute of Electrical and Electronics Engineers (IEEE) 802.16 system, cell Identities (IDs) (Cell_IDs or IDCells) are assigned from the perspective of a whole system, whereas sector IDs or segment IDs are assigned from the perspective of the service coverage of each BS, ranging from 0 to 2. The UEs 120a to 120i, which are mobile or fixed, are generally distributed over the wireless communication system 100. Each UE may communicate with at least one BS on a downlink and an uplink at a point of time. The communication may be conducted in Frequency Division Multiple Access (FDMA), Time Division Multiple Access (TDMA), Code Division Multiple Access (CDMA), Single Carrier-FDMA (SC-FDMA), Multi Carrier-FDMA (MC-FDMA), Orthogonal Frequency Division Multiple Access (OFDMA), or a combination of them. Herein, a downlink refers to a communication link directed from a BS to a UE and an uplink refers to a communication link directed from the UE to the BS.

Figure 2:
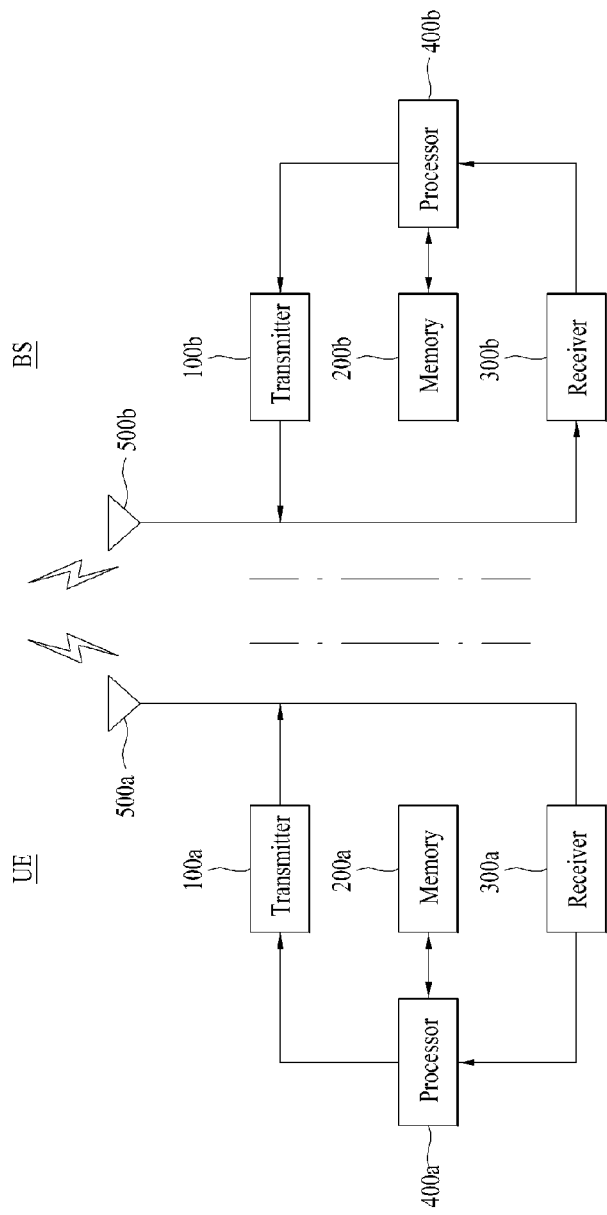
FIG. 2 is a block diagram of components of a user equipment and a base station configured to implement the present invention.

FIG. 2 is a block diagram illustrating a user equipment and a base station for implementing the present invention.

The user equipment (UE) serves as a transmitting apparatus on the uplink and as a receiving apparatus on the downlink. By contrast, the base station (BS) may serve as a receiving apparatus on the uplink and as a transmitting apparatus on the downlink.

The user equipment and the base station include antennas 500a and 500b for receiving information, data, signals, and/or messages, transmitters 100a and 100b for transmitting messages by controlling the antennas 500a and 500b, receivers 300a and 300b for receiving messages by controlling the antennas 500a and 500b, and memories 200a and 200b for storing information associated with communication in the wireless communication system. The user equipment and the base station further include processors 400a and 400b, respectively, which are adapted to perform the present invention by controlling the components of the user equipment and the base station, such as the transmitters 100a and 100b, the receivers 300a and 300b, and the memories 200a and 200b. The transmitter 100a, the memory 200a, the receiver 300a, and the processor 400a in the user equipment may be configured as independent components by separate chips or their separate chips may be incorporated into a single chip. Likewise, the transmitter 100b, the memory 200b, the receiver 300b, and the processor 400b in the base station may be configured as independent components on separate chips or their separate chips may be incorporated into a single chip. The transmitter and the receiver may be configured as a single transceiver in the user equipment or the base station.

The antennas 500a and 500b transmit signals generated from the transmitters 100a and 100b to the outside, or transfer radio signals received from the outside to the receivers 300a and 300b. If the transmitters 100a and 100b and/or the receivers 300a and 300b support a Multiple Input Multiple Output (MIMO) function using a plurality of antennas, each of them may be connected to two or more antennas.

The processors 400a and 400b generally provide overall control to the modules of the user equipment and the base station. Especially, the processors 400a and 400b may carry out a control function for performing the present invention, a Medium Access Control (MAC) frame variable control function based on service characteristics and a propagation environment, a power saving mode function for controlling idle-mode operations, a handover function, and an authentication and encryption function. The processors 400a and 400b may also be referred to as controllers, microcontrollers, microprocessors, microcomputers, etc. The processors 400a and 400b may be achieved by hardware, firmware, software, or their combination. In a hardware configuration, the processors 400a and 400b may be provided with one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), for implementing the present invention. In a firmware or software configuration, firmware or software may be configured to include a module, a procedure, a function, etc. for performing functions or operations of the present invention. This firmware or software may be provided in the processors 400a and 400b, or may be stored in the memories 200a and 200b and driven by the processors 400a and 400b.

The transmitters 100a and 100b perform predetermined coding and modulation for signals and/or data, which are scheduled by schedulers connected with the processors 400a and 400b and transmitted to the outside, and then transfer the modulated signals and/or data to the antennas 500a and 500b. For example, the transmitters 100a and 100b convert a transmission data stream to K signal streams by demultiplexing, channel coding, modulation, etc. The K signal streams are transmitted through the antennas 500a and 500b after being processed in transmission processors of the transmitters 100a and 100b. The transmitters 100a and 100b and the receivers 300a and 300b of the user equipment and the base station may be configured in different manners depending on the procedures of processing transmitted signals and received signals.

Figure 3:
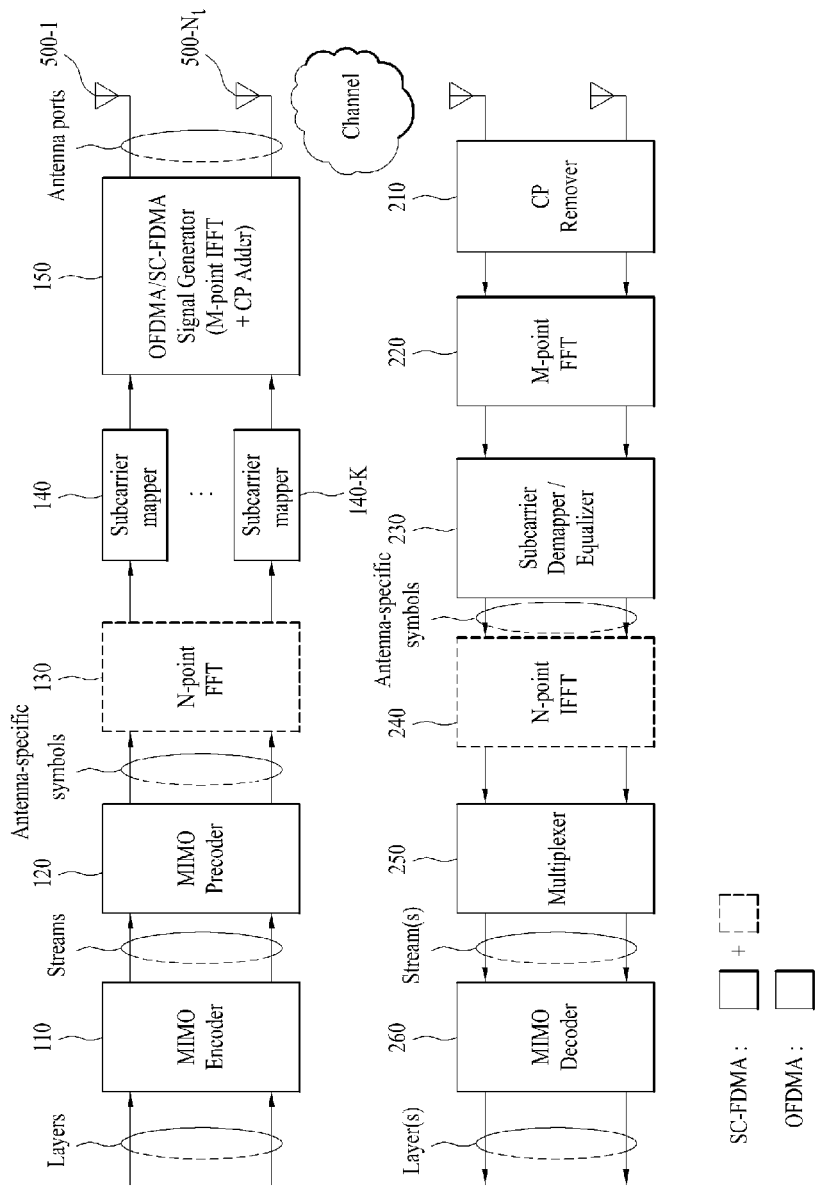
FIG. 3 shows one example of a transmitter structure in each of a user equipment and a base station.

FIG. 3 is a block diagram illustrating an example of a transmitter in each of the user equipment and the base station. Operations of the transmitters 100a and 100b will be described below in more detail with reference to FIG. 3.

Referring to FIG. 3, each of the transmitters 100a and 100b includes a MIMO encoder 110, a MIMO precoder 120, subcarrier mappers 140-1 to 140-K, Orthogonal Frequency Division Multiplexing (OFDM) signal generators and $N_t$ transmission antennas 500-1 to 500-$N_t$.

The MIMO encoder 110 encodes a transmission data stream in accordance with a predetermined coding scheme to form coded data and modulates the coded data to be arranged as symbols representing positions on a signal constellation in a predetermined modulation scheme. The modulation scheme may be, but not limited to, any of m-Phase Shift Keying (m-PSK) and m-Quadrature Amplitude Modulation (m-QAM). For modulating the coded data, the encoder 110 may have an independent modulation module. In the mean time, the MIMO encoder 110 may define the layers of the input symbols such that the MIMO precoder 120 can distribute antenna-specific symbols to corresponding antenna paths. A layer refers to an information path input to the MIMO precoder 120, and the information path before the MIMO precoder 120 may be referred to as a virtual antenna or layer. To define the layers of the symbols, the MIMO encoder 110 may be provided with a layer mapper configured as an independent module.

The MIMO precoder 120 outputs antenna-specific symbols to the subcarrier mappers 140-1 to 140-K by processing the received symbols in accordance with to a MIMO scheme according to the multiple transmission antennas 500-1 to 500-$N_t$. Mapping of the MIMO streams to the antennas 500-1 to 500-$N_t$ is performed by the MIMO precoder 120. Specifically, the MIMO precoder 120 multiplies the output x of the MIMO encoder 11 by an $N_t \times M_t$ precoding matrix W. The output of the MIMO precoder 120 may be represented as an $N_t \times N_F$ matrix z.

The subcarrier mappers 140-1 to 140-K allocate the antenna-specific symbols to appropriate subcarriers and multiplex them according to user equipments. In the mean time, the subcarrier mappers 140-1 to 140-K may include a Logical Resource Unit (LRU) allocation block (not shown) for dividing the modulated symbols into LRU sized segments and allocating each segment to the LRU. The subcarrier mappers 140-1 to 140-K can include a mapping block (not shown) for mapping the LRU into burst data. The data burst is allocated to a Physical Resource Unit (PRU) in a physical frequency domain. Accordingly, the subcarrier mappers 140-1 to 140-K serve to map the modulated data into subcarriers in accordance with a mapping relation between the LRU and the PRU.

The OFDMA signal generator(s) 150 output OFDM symbols by modulating the antenna-specific symbols according to an OFDM modulation scheme. For example, the OFDMA signal generators 150 may perform Inverse Fast Fourier Transform (IFFT) for the antenna-specific symbols and insert a Cyclic Prefix (CP) into the resulting IFFT time-domain symbol. After digital-to-analog conversion and frequency upconversion, the OFDMA symbol is transmitted to the receiver through the transmission antennas 500-1 to 500-$N_t$. The OFDMA signal generator 150 may include an IFFT module, a CP inserter, a Digital-to-Analog Converter (DAC), and a frequency upconverter.

The OFDMA receivers 300a and 300b process signals in reverse to the operation of the OFDMA transmitters. More specifically, the receivers 300a and 300b decode and demodulate radio signals received through the antennas 500a and 500b from the outside and transfer the demodulated signals to the processors 400a and 400b. The antenna 500a or 500b connected to each of the receivers 300a and 300b may include $N_r$ reception antennas. Signals received through the respective reception antennas are downconverted to baseband signals and recovered to an original data stream intended by the transmitter 100a or 100b, after multiplexing and channel demodulation. Therefore, each of the receivers 300a and 300b may have a signal recoverer for downconverting received signals to baseband signals, a multiplexer for multiplexing the baseband signals, and a channel demodulator for demodulating the multiplexed signal stream to a data stream. The signal recoverer, the multiplexer, and the channel demodulator may be configured as separate modules or incorporated into a single module. More specifically, the signal recoverer may include an Analog-to-Digital Converter (ADC) for converting an analog signal to a digital signal, a CP remover 210 for removing a CP from the digital signal, a Fast Fourier Transform (FFT) module 220 for generating frequency symbols by applying FFT to the CP-removed signal, and a subcarrier demapper/equalizer 230 for recovering the frequency symbols to antenna-specific symbols. A multiplexer 250 recovers MIMO streams from the antenna-specific symbols and a MIMO decoder 260 recovers the data streams transmitted by the transmitting apparatus from the MIMO streams.

Compared to the OFDMA transmitter, a Single Carrier Frequency Division Multiple Access (SC-FDMA) transmitter further includes an FFT module 130 before the subcarrier mappers 140 to 140-K. The SC-FDMA transmitter may significantly reduce Peak-to-Average Power Ratio (PAPR) by spreading a plurality of data in the frequency domain through FFT before IFFT is performed, relative to the OFDMA scheme. An SC-FDMA receiver further includes an IFFT module 240 after the subcarrier demapper/equalizer 230 in addition to the components of the OFDMA receiver. The SC-FDMA receiver processes a signal in reverse to the operation of the SC-FDMA transmitter.

Although it has been described in FIG. 2 and FIG. 3 that each of the transmitters 110a and 100b includes the MIMO encoder 110, the MIMO precoder 120, the subcarrier mappers 140-1 to 140-K, and the OFDMA/SC-FDMA signal generator 150, the processors 400a and 400b of the transmitting apparatus may include the MIMO encoder 110, the MIMO precoder 120, the subcarrier mappers 140-1 to 140-K, and the OFDMA/SC-FDMA signal generator 150. Likewise, although it has been described in FIG. 2 and FIG. 3 that each of the receivers 300a and 300b includes the signal recoverer, the multiplexer, and the MIMO decoder, the processors 400a and 400b of the receiving apparatus may include the signal recoverer, the multiplexer, and the MIMO decoder. Hereinafter, for convenience of description, the MIMO encoder 110, the MIMO precoder 120, the subcarrier mappers 140-1 to 140-K, and the OFDMA/SC-FDMA signal generator 150 are included in the transmitters 100a and 100b separated from the processors 400a and 400b that control the operations of the MIMO encoder 110, the MIMO precoder 120, the subcarrier mappers 140-1 to 140-K, and the OFDMA/SC-FDMA signal generator 150. And, the signal recoverer, the multiplexer, and the MIMO decoder are included in the receivers 300a and 300b separated from the processors 400a and 400b that control the operations of the signal recoverer, the multiplexer, and the MIMO decoder. However, the embodiments of the present invention can equally be applied to the case where the MIMO encoder 110, the MIMO precoder 120, the subcarrier mappers 140-1 to 140-K, and the OFDMA/SC-FDMA signal generator 150 are included in the processors 400a and 400b and the case where the signal recoverer, the multiplexer, and the MIMO decoder are included in the processors 400a and 400b.

The memories 200a and 200b may store programs required for signal processing and controlling of the processors 400a and 400b and temporarily store input and output information. Each of the memories 200a and 200b may be implemented into a flash memory-type storage medium, a hard disc-type storage medium, a multimedia card micro-type storage medium, a card-type memory (e.g. a Secure Digital (SD) or eXtreme Digital (XS) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, or an optical disk.

Figure 4:
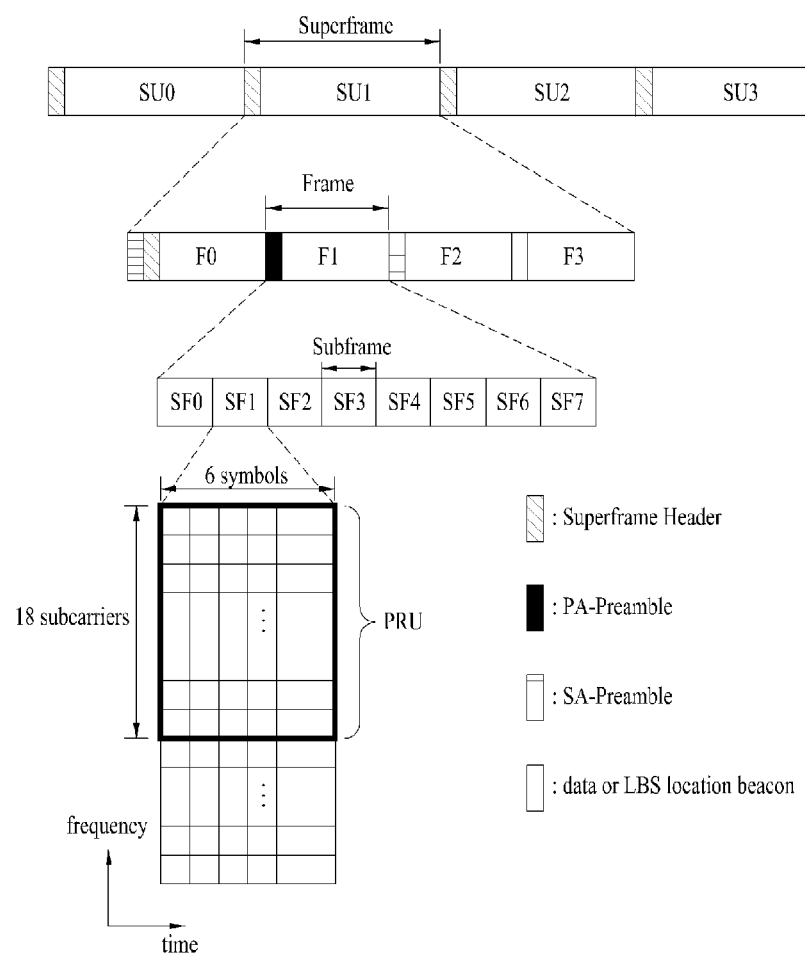
FIG. 4 shows one example of a radio frame structure of IEEE 802.16m.

FIG. 4 illustrates a structure of a radio frame of the IEEE 802.16 system. The radio frame structure can be applied to a Frequency Division Duplex (FDD) mode, a Half Frequency Division Duplex (H-FDD) mode, and a Time Division Duplex (TDD) mode.

Referring to FIG. 4, the radio frame includes superframes SU0 to SU3 of 20 ms that support a bandwidth of 5 MHz, 8.75 MHz, 10 MHz or 20 MHz. Each superframe includes four frames F0 to F3 of 5 ms having the same size, and starts with a SuperFrame Header (SFH). The SFH carries essential system parameters and system configuration information. The SFH can be located within the first subframe of the superframe. The SFH can be classified into a Primary SFH (P-SFH) and a Secondary SFH (S-SFH). The P-SFH is transmitted per superframe. The S-SFH may be transmitted per superframe. The SFH can include a broadcast channel.

One frame can include eight subframes SF0 to SF7. The eight subframes within each from are numbered from 0 to 7. The frame can be configured differently depending on duplex modes. For example, since downlink transmission and uplink transmission are identified by frequency in the FDD mode, one frame includes either downlink subframes or uplink subframes. In the FDD mode, an idle time can exist at the end of each frame. On the other hand, since downlink transmission and uplink transmission are identified by time in the TDD mode, subframes within the frame are classified into a downlink subframe and an uplink subframe. In the TDD mode, an idle time referred to as a Transmit/receive Transition Gap (TTG) exists while the downlink is being changed to the uplink. Also, idle time referred to as a Receive/transmit Transition Gap (RTG) exists while the uplink is being changed to the downlink.

The subframe is a unit of a Transmission Time Interval (TTI). In other words, one TTI is defined by one or more subframes. In general, basic TTI is set to one subframe. The TTI means a time interval that a physical layer transmits coded packets through a radio interface. Accordingly, one subframe or a plurality of neighboring subframes can be used for transmission of data packets.

The subframe includes a plurality of OFDMA symbols in a time domain and a plurality of subcarriers in a frequency domain. The OFDMA symbols may be referred to as OFDMA symbols or SC-FDMA symbols depending on a multiplexing access mode. The number of OFDMA symbols included in one subframe can be varied depending on channel bandwidth and CP length. A type of the subframe can be defined depending on the number of OFDMA symbols included in the subframe. For example, the type of the subframe can be defined in such a manner that subframe type-1 includes six OFDMA symbols, subframe type-2 includes seven OFDMA symbols, subframe type-3 includes five OFDMA symbols, and subframe type-4 includes nine OFDMA symbols. One frame may include one type of subframes or different types of subframes. For convenience of description, the subframe type-1 that includes six OFDMA symbols is described in the embodiments of the present invention. However, the embodiments of the present invention, which will be described later, can be applied to the other types of subframes in the same manner.

In the frequency domain, the OFDMA symbol includes a plurality of subcarriers, and the number of subcarriers is determined depending on the size of FFT. The subcarriers can be classified into data subcarriers for data transmission, pilot subcarriers for channel measurement, and null subcarriers for guard band and DC components. Examples of parameters for the OFDMA symbols include BW, $N_{used}$, n, G, etc. The BW is a nominal channel bandwidth. $N_{used}$ is the number of subcarriers used for signal transmission. Also, n is a sampling factor, and determines subcarrier spacing and useful symbol time together with BW and $N_{used}$. G is a ratio between CP time and useful time.

In the frequency domain, resources can be grouped in a predetermined number of subcarriers. A group comprised of a predetermined number of subcarriers within one subframe is referred to as a Resource Unit (RU). A resource unit is a basic unit for resource allocation. A basic unit of resource allocation in a logical frequency domain may be called a logical resource unit (LRU), while a basic unit of resource allocation in a physical frequency domain may be called a physical resource unit (PRU). The logical resource unit is mapped to the physical resource unit by frequency permutation. In this case, the permutation means a process for mapping a physical resource of a prescribed unit to a logical resource. As a frequency resource is permutated on frequency axis, a transmission signal is transmitted in a manner of being distributed on a corresponding bandwidth over the frequency axis. Hence, even if a channel status of a specific frequency is poor, it may be able to prevent the transmission signal from being entirely damaged. The frequency permutation may be classified into a distributed permutation and a localized permutation. In particular, the distributed permutation maps a physical resource to a logical resource by a unit of a single resource unit and the logical permutation maps a physical resource to a logical resource unit by a unit of a prescribed number of contiguous resource units.

The subframe includes a plurality of PRUs in the frequency domain. The PRU includes a plurality of continuous OFDMA symbols in the time domain and a plurality of continuous subcarriers in the frequency domain. For example, the number of OFDMA symbols within the PRU may be the same as the number of OFDMA symbols included in the subframe. Accordingly, the number of OFDMA symbols within the PRU can be determined depending on the type of the subframe. In the mean time, the number of subcarriers within the PRU may be 18. In this case, the PRU includes 6 OFDM symbols×18 subcarriers. The PRU can be denoted as a Distributed Resource Unit (DRU) or a Contiguous Resource Unit (CRU) depending on a resource allocation type. A basic permutation unit of a downlink DRU is a tile that includes 6 subcarriers and $N_{sym}$ symbols. A basic permutation unit of a downlink DRU is a tone-pair that includes two subcarriers and one symbol. In case of the subframe type-1, one PRU includes 108 tones. A tone can be also referred to as a resource element.

The subframe can be divided into at least one Frequency Partition (FP) in the frequency domain. The FP can be used for Fractional Frequency Reuse (FFR). Each FP includes one or more PRUs. Distributed resource allocation and/or contiguous resource allocation can be applied to each FP. A Logical Resource Unit (LRU) is a basic logical unit for distributed resource allocation and contiguous resource allocation. A Logical Distributed Resource Unit (LDRU) includes a plurality of subcarriers (Sc) distributed within the frequency band. The LDRU has the same size as that of the PRU. The LDRU is also referred to as a distributed LRU (DLRU). A Logical Contiguous Resource Unit (LCRU) includes contiguous subcarriers (Sc). The LCRU has the same size as that of the PRU. The LCRU is also referred to as a contiguous LRU (CLRU).

Meanwhile, a frequency band may be divided by a subband unit constructed with a prescribed number of resource units. For instance, assuming that a single subband includes 4 contiguous PRUs, a frequency band of 5 MHz may be divided into maximum 4 subbands, a frequency band of 10 MHz may be divided into maximum 10 subbands, or a frequency band of 20 MHz may be divided into maximum 21 subbands.

The aforementioned structure is only exemplary. Accordingly, various modifications can be made in the length of the superframe, the number of subframes included in the superframe, the number of OFDMA symbols included in the subframe, and parameters of OFDMA symbols. For example, the number of subframes included in the frame can be varied depending on the channel bandwidth and the CP length.

In the mean time, a maximum of four synchronization signals may be transmitted in one superframe. For example, in the IEEE 802.16m system, a downlink synchronization signal includes a primary synchronization signal and a secondary synchronization signal, wherein the primary synchronization signal includes a PA-Preamble and the secondary synchronization signal includes an SA-Preamble. In the FDD mode and the TDD mode, each of the PA-Preamble, the SA-Preamble or a Location Based Service (LBS) location beacon is located at the first symbol of each frame. In more detail, the PA-Preamble is located at the first symbol of the second frame F1 within the superframe, and the SA-Preamble is located at the first symbol of each of the first and third frames F0 and F2 within the superframe. The first symbol of the last frame F3 within the superframe contains the LBS location beacon if the superframe is for location measurement for LBS, or the first symbol of the last frame F3 within the superframe contains a data signal. The PA-Preamble carries system bandwidth and carrier configuration information. Accordingly, the UE can obtain system bandwidth and carrier configuration information from the PA-Preamble.

The SA-preamble carries cell identifier (Cell-ID). The SA-preamble is transmitted twice at the first symbols of the first and the third frames during a superframe. The UE detects Cell-ID of a corresponding base station and performs cell-scanning during handover, using a SA-preamble transmitted twice within a superframe.

In the following description, transmission of E-MBS data is explained.

E-MBS related parameters (e.g., a security key, an E-MBS connection identifier, a service flow identifier, etc.), which are used to transmit contents of certain service flow(s) for E-MBS, may be set different in accordance with an area, E-MBS contents may be broadcast within a limited zone only. Hence, when a user equipment in the course of receiving an E-MBS content moves away into a different base station or performs a handover, the user equipment should determine whether a saved E-MBS information is valid and whether the E-MBS content can be continuously received.

If a current base station provides E-MBS via a parameter different from the E-MBS information retained by a user equipment or does not provide an E-MBS content, the user equipment should access a new base station in order to update the parameter for the E-MBS content. In order to solve this problem, an E-MBS zone may be configured in a manner of grouping at least one or more E-MBS providing base stations. Hence, the E-MBS content is transmitted via a locally divided E-MBS zone and E-MBS related parameters may be configured different from each other between different E-MBS zones. The E-MBS zone may be defined as a group of base stations involved in single frequency network (SFN) transmission. Each E-MBS zone may be identified via a unique E-MBS zone ID. Each cell may have a different number of E-MBS zones differing in type. And, a single base station may belong to at least one E-MBS zone.

Each base station within the same E-MBS zone transmits E-MBS content to user equipments using the same E-MBS parameter(s). In order for a user equipment to recognize an E-MBS zone, each of the base stations delivers an E-MBS zone ID to the user equipment. Through the E-MBS zone ID received from the base station, the user equipment may be able to directly confirm whether a currently retained E-MBS parameter is valid or not.

Moreover, E-MBS related parameters (e.g., E-MBS ID, service flow ID, etc.) used for a common E-MBS content and service are identical for all advanced base stations (ABSs) within the same E-MBS zone, in case that a user equipment moves away into a different base station within the same E-MBS zone, it may be unnecessary to perform a procedure for resetting E-MBS related parameters to receive E-MBS data. Moreover, as the base stations within the same E-MBS zone transmit E-MBS data using the same radio resource at the same time, it may be able to increase reception efficiency of the E-MBS data of user equipments through macro diversity effect.

E-MBS data for a plurality of E-MBS zones are multiplexed together and then transmitted. E-MBS data and unicast data are multiplexed together and then transmitted. Thus, as a method of multiplexing E-MBS data differing from each other in property or type, there are TDM (time division multiplexing) and/or FDM (frequency division multiplexing).

The TDM is a scheme of distributing available time resource to contents of a plurality of E-MBS zones or to E-MBS content and unicast content. In particular, according to the TDM, the same subcarrier may be used for transmission of a content of one E-MBS zone or may be used for a content of another E-MBS zone or unicast content, in accordance with time. In case of multiplexing certain E-MBS data with another E-MBS data or unicast data using TDM, since the certain E-MBS data is allocated across a whole frequency band in a prescribed time interval, a receiving device may be able to obtain channel estimation information using pilot signal of the whole frequency band.

The FDM is a scheme of distributing available frequency resource to contents of a plurality of E-MBS zones or to E-MBS content and unicast content. In particular, according to the FDM, contents of a plurality of E-MBS zones coexist in the same symbol or E-MBS content and unicast content coexist in the same symbol. In case of multiplexing certain E-MBS data with another E-MBS data or unicast data using FDM, E-MBS channel estimation unit may vary according to a permutation scheme. For instance, in case of a distributed permutation for performing permutation by a unit of one resource unit, channel estimation should be performed by one resource unit as well. On the other hand, in case of a localized permutation for performing permutation by a unit of several neighboring resource units (e.g., 3 resource units, 4 resource units, 5 resource units, etc.), it may be possible to estimate E-MBS channel within the several resource units. Generally, channel estimation performance gets better if performed in wider frequency intervals. If data is allocated to contiguous resources in frequency domain, channel estimation effect increases. Therefore, according to the present invention, a frequency resource is allocated to E-MBS data. In logical frequency domain, a frequency band is partitioned into a plurality of subbands. And, numbers starting with 1 are given to a plurality of subbands in order, respectively. For instance, if one subband is defined as configured with 4 PRUs, a frequency band of 20 MHz may be partitioned into 21 subbands. And, numbers ranging 1 to 21 are given to the 21 subbands, respectively. In the following description, the number given to each subband shall be named a subband index.

Meanwhile, the processor 400b of the base station may be able to obtain a system bandwidth based on PA-preamble. Hence, the base station processor 400b may be able to determine the number of subbands included in the corresponding downlink frequency bandwidth.

In the following description, in case of multiplexing contents differing from each other in property/type together by FDM, a method of assigning E-MBS zone(s) to a frequency resource and $1^{st}$ to $4^{th}$ embodiments of the present invention for signaling information on a size and position of the E-MBS zone(s) assigned frequency resource are explained. For clarity, in the following description of the present invention, a frequency interval allocated to transmission of E-MBS data shall be named an E-MBS zone and a frequency interval allocated to transmission of unicast data shall be named a unicast zone. Meanwhile, although embodiments of the present invention are explained by taking a system bandwidth of 20 MHz as an example in the following description, it may be apparent that the embodiments of the present invention are applicable to other system bandwidths in the same manner. For the system bandwidth of 20 MHz, maximum 21 subbands may be available for resource allocation.

$1^{st}$ Embodiment

Figure 5:
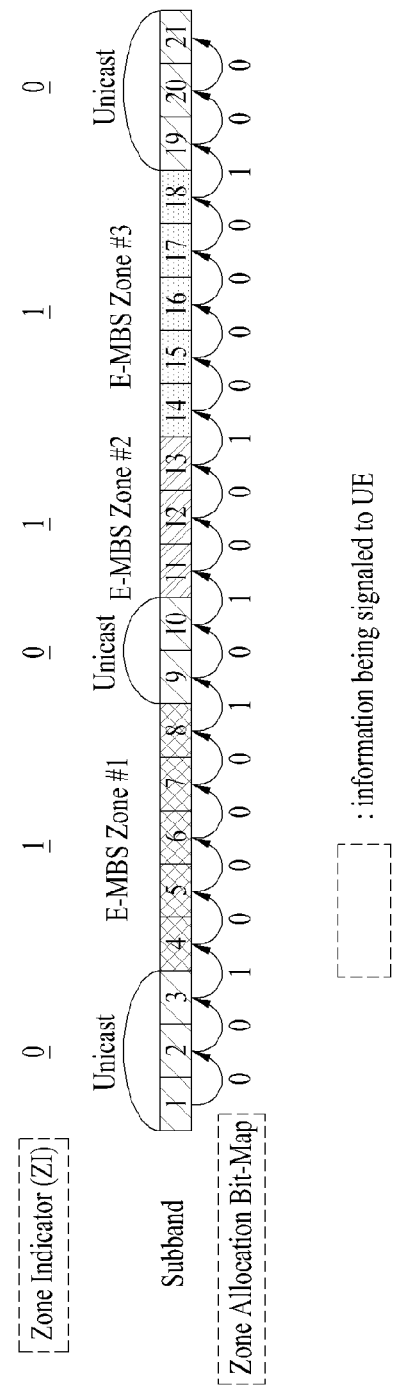
FIG. 5 shows one example of allocation of E-MBS zone and resource allocation information according to a $1^{st}$ embodiment of the present invention.

FIG. 5 shows one example of allocation of E-MBS zone and resource allocation information according to a $1^{st}$ embodiment of the present invention.

Referring to FIG. 5, E-MBS zone(s) and unicast zone(s) may be allocated to 21 subbands irrespective of order. In particular, in logical domain, E-MBS zone(s) and unicast zone(s) may be located irrespective of order.

A position and size of each of the E-MBS zone(s) and the unicast zone(s) may be notified to a user equipment by Zone Indicator (ZI) and Zone Allocation Bit-Map.

The ZI indicates a configuration of a zone in logical domain by the bit allocated to each zone. For instance, a bit set to 0 in the ZI may be defined as indicating a unicast zone and a bit set to 1 in the ZI may be defined as indicating one E-MBS zone. Referring to FIG. 5, since subbands are allocated in order of unicast zone, E-MBS zone #1, unicast zone, E-MBS zone #2, E-MBS zone #3 and unicast zone, base station(s) participating in the multiplexing may transmit the ZI set to 010110 to the user equipment. The user equipment receives the ZI and may then recognize that the subbands are allocated in order of unicast zone, E-MBS zone, unicast zone, E-MBS zone, E-MBS zone and unicast zone. Yet, it may be unable to indicate the number of subbands allocated to each of the zones using the ZI only. Hence, information indicating the number of the subbands allocated to each of the zones is provided to the user equipment.

The zone allocation bitmap may indicate whether a usage of a resource is changed between one subband and next subband. For instance, '0' may be defined as indicating that one subband and next subband are available for the same usage and '1' may be defined as indicating that one subband and next subband are available for another usage. For another instance, if a bit is toggled between subbands, it may be defined as indicating that a usage is changed. Hence, assuming that the number of maximum available subbands on a specific system bandwidth is $subband_{max}$, the zone allocation bitmap may have a length of '$subband_{max}-1$'.

Referring to FIG. 5, for instance, the subband 8 is the resource allocated to the E-MBS zone #1 but the subband 9 next to the subband 8 is the resource allocated to the unicast zone. And, the subband 8 and the subband 9 may differ from each other in usage. Hence, the bit corresponding to the subband 8 and the subband 9 is set to 1. For another instance, since the subband 9 and the subband 10 next to the subband 9 are the resources allocated to the unicast zone, the bit corresponding to the subband 9 and the subband 10 is set to 0. For another instance, the subband 13 is the resource allocated to the E-MBS zone #2 and the subband 14 next to the subband 13 is the resource allocated to the E-MBS zone #3. Although each of the E-MBS zone #2 and the E-MBS zone #3 is the E-MBS zone, since parameters required for a data transmission such as a service flow and the like vary in accordance with the E-MBS zone, it may be highly probable that property of E-MBS data carried on the subband 13 is different from that of E-MBS data carried on the subband 14. Therefore, according to the embodiments of the present invention, ZI and/or zone allocation bitmap is configured in a manner that resources allocated to different E-MBS zones are regarded as differing from each other in usage.

Referring to FIG. 5, base station(s) joining in transmission of E-MBS data may be able to transmit a zone allocation bitmap configured with 001000010100010000100. And, the base station(s) may transmit the corresponding E-MBS data on the subband allocated to the E-MBS zone to which the corresponding base station(s) belongs. For instance, in case that a base station belongs to the E-MBS zone #1 and the E-MBS zone #2, the base station may be able to transmit data of the E-MBS zone #1 via the subbands 4 to 8 allocated to the E-MBS zone #1 and may also be able to transmit data of the E-MBS #3 via the subbands 14 to 18 allocated to the E-MBS zone #3. Moreover, the base station may be able to transmit unicast data for a user equipment or a user equipment group having the user equipment via at least one of the subbands 1, 2, 3, 9, 10, 19, 20 and 21.

The user equipment received the zone allocation bitmap set to 001000010100010000100 and may be able to recognize that 3 subbands, 5 subbands, 2 subbands, 3 subbands, 5 subbands and 3 subbands are allocated to the unicast zone, the E-MBS zone #1, the unicast zone, the E-MBS zone #2, the E-MBS zone #3 and the unicast zone, respectively, based on the zone allocation bitmap. Based on the ZI and the zone allocation bitmap, the user equipment may be able to know whether to receive or detect the E-MBS data and/or unicast data for the user equipment from which subband. Therefore, the user equipment may be able to receive the corresponding E-MBS data of the E-MBS zone via the subband(s) allocated to the E-MBS zone from the base station(s) of the E-MBS zone in a currently connected state. Alternatively, the user equipment may be able to detect data received on the corresponding subband(s) from a plurality of received data. Unicast data for the user equipment or the user equipment group having the user equipment may be received on the unicast zone. For instance, referring to FIG. 5, the user equipment connected to the E-MBS zone #1 may be able to receive or detect E-MBS data via subbands 4 to 8 from the serving base station within the E-MBS zone #1 or a plurality of base stations within the E-MBS zone #1.

The processor 400b of the base station joining in the transmission of E-MBS data may be able to configure ZI and zone allocation bitmap according to a $1^{st}$ embodiment of the present invention. The base station processor 400b may control the base station transmitter 100b to transmit the ZI and the zone allocation bitmap to a user equipment within a coverage of the base station. The base station processor 400b may be able to control the base station transmitter 100b to broadcast/multicast the corresponding E-MBS data via the subband(s) allocated to the E-MBS zone to which the base station belongs. And, the base station processor 400b may be able to control the base station transmitter 100b to transmit the unicast data for a user equipment or a user equipment group having the user equipment via at least one of subbands allocated for unicast.

The receiver 300a of the user equipment within the coverage of the base station receives the ZI and zone allocation bitmap configured according to the $1^{st}$ embodiment of the present invention and then delivers them to the processor 400a of the user equipment. The processor 400a of the user equipment may be able to determine whether to receive or detect E-MBS data and/or unicast data for the user equipment on which subband based on the ZI and the zone allocation bitmap. The user equipment processor 400a may be able to control the user equipment receiver 300a to receive the corresponding E-MBS data of the E-MBS zone via the subband(s) allocated to the E-MBS zone from base station(s) of the E-MBS zone with which the user equipment is currently connected. The user equipment processor 400a may be able to control the user equipment receiver 300a to receive unicast data for the user equipment on the subband(s) allocated to the unicast. And, the user equipment processor 400a may be able to detect data of each E-MBS zone and/or unicast data from among a plurality of data received by the user equipment receiver 300a based on the corresponding subband(s).

According to the $1^{st}$ embodiment, it may be advantageous in that a base station may be able to freely schedule transmissions of E-MBS data and unicast data. Yet, as E-MBS zones existing by being spaced apart increase, it may be advantageous in that overhead of ZI increases. For instance, a frequency band of 20 MHz can be divided into maximum 21 subbands, if the 21 subbands are allocated to different zones, respectively, the base station should construct the ZI with minimum 21 bits.

In order to clear such a disadvantage of the $1^{st}$ embodiment as the increasing overhead of the ZI due to the E-MBS increase, according to $2^{nd}$ to $4^{th}$ embodiments of the present invention, resources having the lowest or highest index are collectively allocated to E-MBS zone(s) and the rest of resources are allocated to unicast data. According to the $2^{nd}$ to $4^{th}$ embodiments of the present invention, in a logical domain, resources having indexes smaller or greater than a prescribed index are utilized for transmission of E-MBS data and subband(s) having indexes greater or smaller than the prescribed index are utilized for unicast transmission. In particular, the resources allocated to the transmission of E-MBS data are contiguously located in logical frequency domain and the unicast resources are contiguously located in the logical frequency domain as well.

For clarity and convenience of the following description, assuming that a frequency resource is allocated to E-MBS zone by a subband unit and that subband(s) having lowest index(es) is(are) allocated to transmission of E-MBS data, the $2^{nd}$ to $4^{th}$ embodiments of the present invention are explained.

Figure 6:
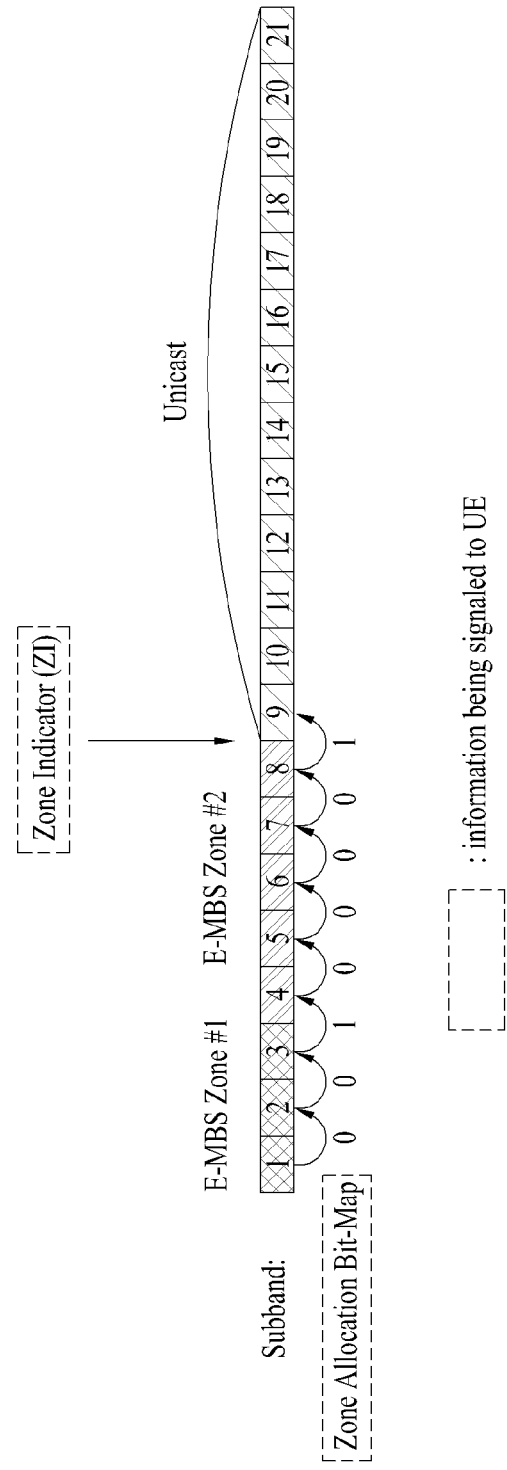
FIG. 6 shows one example of allocation of E-MBS zone and resource allocation information according to a $2^{nd}$ embodiment of the present invention.
Figure 7:
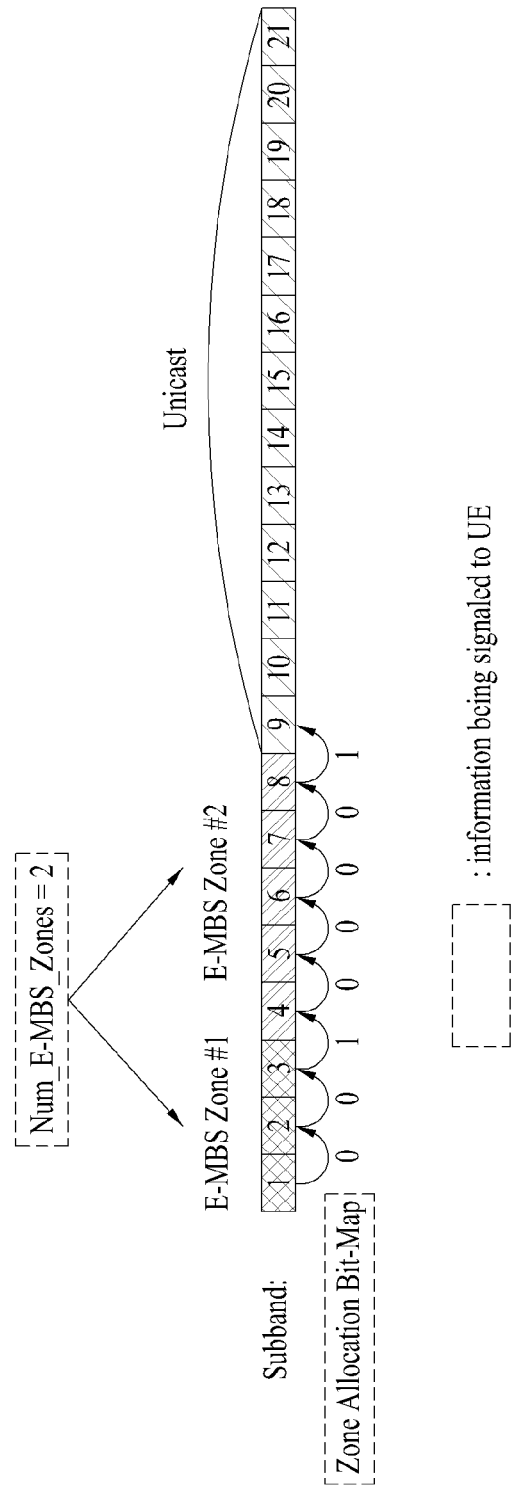
FIG. 7 shows one example of allocation of E-MBS zone and resource allocation information according to a $3^{rd}$ embodiment of the present invention.

The $2^{nd}$ to $4^{th}$ embodiments of the present invention are described with reference to FIGS. 6 to 8 as follows. In case that subbands are allocated to E-MBS zone(s) and unicast data, as shown in FIGS. 6 to 8, according to the aforementioned $1^{st}$ embodiment, '110' may be transmitted as ZI and '00100001010010000100' may be transmitted as a zone allocation bitmap. In particular, according to the aforementioned $1^{st}$ embodiment, in order to signal the configuration of the E-MBS zone allocated as shown in FIGS. 6 to 8 to a user equipment, overhead amounting to 23 bits (=3+20) is generated.

$2^{nd}$ Embodiment

FIG. 6 shows one example of allocation of E-MBS zone and resource allocation information according to a $2^{nd}$ embodiment of the present invention.

Referring to FIG. 6, a prescribed number of subbands having lowest indexes are allocated to E-MBS data(s) and the rest of subbands may be allocated to unicast data. In particular, a logical domain is divided into an E-MBS data region and a unicast region.

A position and size of each E-MBS zone and a position and size of unicast zone may be notified to a user equipment via Zone Indicator (ZI) and Zone Allocation Bit-Map. Yet, unlike the former ZI as a sort of bitmap in the $1^{st}$ embodiment, a zone indicator used for the $2^{nd}$ embodiment of the present invention may indicates a last subband allocated to E-MBS zone or an initial subband allocated to unicast data. In particular, the ZI according to the $2^{nd}$ embodiment of the present invention indicates a boundary between an E-MBS region and a unicast region in a logical frequency domain. For instance, if the ZI is defined as indicating a last subband allocated to E-MBS zone, the ZI may be configured to indicate an index of the last subband. Referring to FIG. 6, since the last subband allocated to the E-MBS zone is the subband 8, the ZI may be configured to indicate '8'. A length of the ZI may vary in accordance with a downlink system bandwidth. For instance, if a downlink system bandwidth is 20 MHz, since maximum 21 subbands may be allocated to E-MBS data transmission, 5 bits are required to indicate the last subband allocated to E-MBS data.

The ZI for 20 MHz, which is configured according to the aforementioned $1^{st}$ embodiment, has a length ranging to maximum 21 bits from minimum 2 bits. Yet, the ZI for 20 MHz, which is configured according to the $2^{nd}$ embodiment, has a length of 5 bits at most irrespective of the number of E-MBS zones. Hence, if a logical frequency band is divided into at least 6 zones, the signaling overhead for the ZI of the $2^{nd}$ embodiment gets smaller than that for the ZI of the $1^{st}$ embodiment. The signaling overhead in the $1^{st}$ embodiment increases in proportion to the number of the divided zones. Yet, it may be advantageous in that the signaling overhead in the $2^{nd}$ embodiment does not become greater than 5 bits despite that the number of zones increases.

Referring to FIG. 6, base station(s) transmits E-MBS data and uses a downlink system bandwidth of 20 MHz. The base station(s) may be able to transmit a ZI, which indicates a boundary between E-MBS region and unicast region within a frequency band, e.g., a ZI indicating a last subband 8 included in the E-MBS region to a user equipment. The user equipment receives the ZI and is then aware that the subbands in the downlink frequency band up to the subband 8 are allocated for the transmission of the E-MBS data and that the subbands starting with the subband 9 are allocated for the transmission of the unicast data.

Meanwhile, according to the $2^{nd}$ embodiment of the present invention, a zone allocation bitmap is configured to have the bit number amounting to the number of subbands allocated to the E-MBS region. For instance, if the total number of subbands allocated to E-MBS zone(s) is n, a base station configures n-bit zone allocation bitmap and then transmits the corresponding bitmap to a user equipment. Referring to FIG. 6, subbands 1 to 8 having 8 lowest indexes are allocated to E-MBS zone #1 and E-MBS zone #2. Therefore, a $2^{nd}$ type zone allocation bitmap has 8 bits and each of the bits indicates whether a usage between two adjacent subbands is identical for subbands 1 to 9. The zone allocation bitmap according to the $2^{nd}$ embodiment of the present invention may be defined as configured in a manner that a corresponding bit is toggled or set to 1 each time a usage of the subband is changed for example. Referring to FIG. 6, the subband 3 is allocated to the E-MBS zone #1 but the subband 4 next to the subband 3 is allocated to the E-MBS zone #2. Hence, the bit corresponding to the subband 3 and the subband 4 is set to 1. The subband 8 is allocated to the E-MBS zone #2 but the subbands following the subband 8 are allocated for unicast. Hence, the bit corresponding to the subband 8 and the subband 9 is set to 1 as well. And, the rest of bits are set to 0. According to the $2^{nd}$ embodiment of the present invention, a bit is not allocated to indicate whether a usage between subbands allocated for unicast is changed.

Referring to FIG. 6, base station(s) may be able to transmit a zone allocation bitmap configured with 00100001 to a user equipment. And, the base station(s) may transmit the corresponding E-MBS data on a subband allocated to E-MBS zone to which the corresponding base station(s) belongs. For instance, in case that a base station belongs to the E-MBS zone #1, the base station may transmit data of the E-MBS zone #1 via subbands 1 to 3 allocated to the E-MBS zone #1. For another instance, in case that a base station belongs to the E-MBS zone #2, the base station may transmit data of the E-MBS zone #2 via subbands 4 to 8 allocated to the E-MBS zone #2. Moreover, the base station may be able to transmit unicast data for a user equipment or a user equipment group to which the user equipment belongs via at least one of subbands 9 to 21.

A user equipment connected to a certain E-MBS zone, e.g., the E-MBS zone #1 receives the zone allocation bitmap configured with 00100001. Since each of $3^{rd}$ and $8^{th}$ bits in the zone allocation bitmap is set to 1, the user equipment may be aware that the subbands 1 to 3 are allocated to the E-MBS zone and that the subbands 4 to 8 are allocated to another E-MBS zone different from the former E-MBS zone having the subbands 1 to 3 allocated thereto. And, the user equipment may be aware that the subbands 9 to 21 are allocated for unicast. In particular, based on the ZI and the zone allocation bitmap, the user equipment is able to know whether to receive or detect the E-MBS data for it and/or unicast data on which subband. Therefore, the user equipment may be able to receive the corresponding E-MBS data of the E-MBS zone #1 via at least one of the subbands 1 to 3 allocated to the E-MBS zone #1 from the base station(s) of the E-MBS zone #1 in a currently connected mode. The user equipment may be able to detect the data received on the subbands 1 to 3 from among a plurality of received data. And, the user equipment may be able to receive the unicast data for the user equipment or a user equipment group having the user equipment via at least one of the subbands 9 to 21 allocated for unicast.

In case that the subbands are allocated to the E-MBS zone(s) and the unicast data, according to the aforementioned $2^{nd}$ embodiment, since the ZI configured with maximum 5 bits and the zone allocation bitmap configured with 8 bits are transmitted, it may generate downlink overhead amounting to 13 bits (=5+8).

Meanwhile, in the following description, in order to indicate a presence or non-presence of a usage change between all subbands like the $1^{st}$ embodiment, a zone allocation bitmap configured with (subband$_{max}$−1) bits shall be named a $1^{st}$ type zone allocation bitmap and a zone allocation bitmap configured with bits amounting to the number of subbands allocated to E-MBS data like the $2^{nd}$ embodiment shall be named a $2^{nd}$ type zone allocation bitmap.

The processor 400b of the base station according to the $2^{nd}$ embodiment of the present invention may be able to configure a ZI indicating a boundary between the E-MBS region and the unicast region and a $2^{nd}$ type zone allocation bitmap including bits amounting to the number of subbands included in the E-MBS region. The base station processor 400b may control the base station transmitter 100b to transmit the ZI and the $2^{nd}$ type zone allocation bitmap to a user equipment within a coverage of the base station. The base station processor 400b may be able to control the base station transmitter 100b to broadcast/multicast the corresponding E-MBS data via the subband allocated to the E-MBS zone to which the base station belongs. And, the base station processor 400b may be able to control the base station transmitter 100b to transmit the unicast data for a user equipment or a user equipment group having the user equipment via at least one of subbands allocated for unicast.

The receiver 300a of the user equipment within the coverage of the base station receives the ZI indicating the boundary between the E-MBS region and the unicast region and the $2^{nd}$ type zone allocation bitmap and then delivers them to the processor 400a of the user equipment. The processor 400a of the user equipment may be able to know the number of subbands included in the E-MBS region and the number of subbands included in the unicast region based on the ZI. The user equipment processor 400a may be able to determine the subband allocated to each E-MBS zone based on the bit set to 1 or the number of toggled bits within the $2^{nd}$ type zone allocation bitmap. In particular, the processor 400a of the user equipment may be able to determine whether to receive or detect E-MBS data and/or unicast data for the user equipment on which subband based on the ZI and the $2^{nd}$ type zone allocation bitmap. The user equipment processor 400a may be able to control the user equipment receiver 300a to receive the corresponding E-MBS data of the E-MBS zone via the subband(s) allocated to the E-MBS zone from base station(s) of the E-MBS zone with which the user equipment is currently connected. The user equipment processor 400a may be able to control the user equipment receiver 300a to receive unicast data for the user equipment on the subband allocated for the unicast. And, the user equipment processor 400a may be able to detect data of each E-MBS zone and/or unicast data from among a plurality of data received by the user equipment receiver 300a based on the corresponding subband(s).

$3^{rd}$ Embodiment

FIG. 7 shows one example of allocation of E-MBS zone and resource allocation information according to a $3^{rd}$ embodiment of the present invention.

If a user equipment is already aware of the number of E-MBS zones existing on a downlink frequency band, a boundary between an E-MBS region and a unicast region may be implicitly signaled with a $2^{nd}$ type zone allocation bitmap only without signaling a zone indicator. For instance, if the number of E-MBS zones is previously signaled to a user equipment via SFH or MAC control message or the number of E-MBS zones is already provided by a prescribed rule, it may be unnecessary to signal a zone indicator to the user equipment.

Referring to FIG. 7, a user equipment, which is already aware that the number of E-MBS zones is 2, may be able to implicitly know that a unicast region starts with a corresponding subband after a bit set to 1 in the $2^{nd}$ place among bits configuring a zone allocation bitmap because the number of the E-MBS zones is 2. The user equipment, which is already aware that the number of E-MBS zones is 2 and receives a zone allocation bitmap configured with 00100001000000000000 [$1^{st}$ type zone allocation bitmap] or a zone allocation bitmap configured with 00100001 [$2^{nd}$ type zone allocation bitmap], may be able to know that subbands are allocated for unicast by starting with the $9^{th}$ subband (i.e., subband 9) because the bit set to 1 in the $2^{nd}$ place is the $8^{th}$ bit of the $2^{nd}$ type zone allocation bitmap.

A base station according to a $3^{rd}$ embodiment of the present invention may be able to transmit a $1^{st}$ type zone allocation bitmap or a $2^{nd}$ type zone allocation bitmap to a user equipment. In most cases, a signaling overhead of the $2^{nd}$ type zone allocation bitmap may be smaller than that of the $1^{st}$ type zone allocation bitmap.

Referring to FIG. 7, a user equipment may be already aware of the number of E-MBS zones located on a downlink frequency band via an SFH or a MAC control message or by a predetermined rule. The user equipment detects a bit set to 1 in the $2^{nd}$ place from the bits configuring a zone allocation bitmap received from a base station and may be then able to know a total number of subbands belonging to E-MBS region based on an order of the bit set to 1 in the $2^{nd}$ place. Since the bit set to 1 in the $2^{nd}$ place in a $1^{st}$ type zone allocation bitmap configured with 00100001000000000000 or a $2^{nd}$ type zone allocation bitmap configured with 00100001 corresponds to an $8^{th}$ bit, the user equipment may be able to know that subbands up to the subband 8 are included in the E-MBS region.

Meanwhile, the user equipment may be able to know the number of zones allocated to the downlink frequency band from the number of bits set to 1 within the received zone allocation bitmap. For instance, if there are 2 bits each of which is set to 1, the user equipment may be able to know that the downlink frequency band is distributed for total 3 kinds of usages, i.e., to total 3 zones. It may be necessary to know that the unicast zone starts with one of the 3 zones. Since the user equipment of the present invention is already aware of the number of the E-MBS zones, it can be observed that the E-MBS region includes the $1^{st}$ and $2^{nd}$ zones in the downlink frequency band and the unicast region includes the $3^{rd}$ zone.

According to the $3^{rd}$ embodiment of the present invention, since a zone indicator is not transmitted, it may be able to reduce an overhead by the amount of the zone indicator. Yet, since it is assumed that the user equipment is already aware of the number of the E-MBS zones, the number of the E-MBS zones should be signaled to the user equipment in any way unless defined in advance. So to speak, in case that the E-MBS zone number is signaled to the user equipment as an SFH or a MAC control message instead of being signaled as ZI, it may generate a signaling overhead amounting to the number of bits necessary for the SFH or the MAC control message to indicate the number of the E-MBS zones. Yet, since the number of the E-MBS zones allocated on the downlink frequency band is smaller than the total number of the subbands in general, it may be highly probable that the number of the bits required for specifying the number of the E-MBS zones is smaller than the number of the bits required for specifying the number of the subbands.

Meanwhile, if the base station transmits the $2^{nd}$ type zone allocation bitmap, the signaling overhead may be further reduced.

In case that the base station according to the $3^{rd}$ embodiment of the present invention transmits the $2^{nd}$ type zone allocation bitmap, the base station may transmit the zone allocation bitmap in the same manner of the aforementioned $2^{nd}$ embodiment. Moreover, the user equipment may be able to recognize the configuration of each E-MBS zone from the $2^{nd}$ type zone allocation bitmap in the same manner mentioned in the description of the $2^{nd}$ embodiment.

The processor 400b of the base station according to the $3^{rd}$ embodiment of the present invention may be able to configure a zone allocation bitmap having a bit toggled on a boundary between zones allocated to a downlink frequency band. The base station processor 400b may control the base station transmitter 100b to transmit the zone allocation bitmap to a user equipment within a coverage of the base station. The base station processor 400b may be able to control the base station transmitter 100b to broadcast/multicast the corresponding E-MBS data via the subband allocated to the E-MBS zone to which the base station belongs. And, the base station processor 400b may be able to control the base station transmitter 100b to transmit the unicast data for a user equipment or a user equipment group having the user equipment via at least one of subbands allocated for unicast. In case that how many E-MBS zones will be allocated to the downlink frequency band is not determined in advance, the base station processor 400b configures an SFH or MAC control message to include information indicating the number of E-MBS zones and may then control the base station transmitter 300b to transmit the SFH or the MAC control message to the user equipment.

The receiver 300a of the user equipment within the coverage of the base station receives the zone allocation bitmap and then delivers it to the processor 400a of the user equipment. The processor 400a of the user equipment may be able to determine the number of the downlink frequency band distributed zones based on the number of the toggled bits within the zone allocation bitmap. For instance, if the number of the toggled bits is 2, the user equipment processor 400a may be able to determine that the frequency resources are distributed to 3 (=2+1) zones. The user equipment processor 400a may obtain the number of E-MBS zones allocated to the corresponding downlink frequency band by a previously defined rule or may obtain information indicating the number of E-MBS zones from the SFH or the MAC control message. Since the user equipment processor 400a knows the number of the E-MBS zones, it may be able to determine the number of subbands in the E-MBS region. For instance, if there are 2 E-MBS zones, the processor 400a of the user equipment may be able to determine that subbands ranging between the subband of a lowest index and the subband corresponding to the bit set to 1 in the $2^{nd}$ place are allocated to the 2 E-MBS zones. Moreover, the user equipment processor 400a may be able to determine the subband allocated to each E-MBS zone based on a position of each bit set to 1 in the zone allocation bitmap or a position of each toggled bit.

The user equipment processor 400a may be able to control the user equipment receiver 300a to receive the corresponding E-MBS data of the E-MBS zone via the subband(s) allocated to the E-MBS zone from base station(s) of the E-MBS zone with which the user equipment is currently connected.

The user equipment processor 400a may be able to control the user equipment receiver 300a to receive unicast data for the user equipment on the subband allocated for the unicast. And, the user equipment processor 400a may be able to detect data of each E-MBS zone and/or unicast data from among a plurality of data received by the user equipment receiver 300a based on the corresponding subband(s).

4th Embodiment

FIG. 8 shows one example of allocation of E-MBS zone and resource allocation information according to a 4th embodiment of the present invention.

In the former descriptions of the 1st to 3rd embodiments, a user equipment may be able to know the number of E-MBS zones by explicitly receiving a signaling of the number of E-MBS zones via ZI, SFH or MAC control message or by a predetermined rule. According to the 1st to 3rd embodiments, except a case that the number of E-MBS zones is determined by the predetermined rule, the number of E-MBS zones is eventually signaled to the user equipment. Hence, it may generate a signaling overhead to specify the number of E-MBS zones.

According to a 4th embodiment of the present invention, a configuration of E-MBS zone(s) and/or a unicast zone is specified with a zone allocation bitmap only. If resources located on one side of a logical frequency domain is collectively allocated for E-MBS and resources on the other side are allocated for unicast, the configuration of the E-MBS zone(s) and/or the unicast zone can be specified with resource allocation information on the E-MBS zone(s) only.

Referring to FIG. 8, like the 2nd embodiment of the present invention, according to a 4th embodiment of the present invention, a zone allocation bitmap having bits amounting to the number of subbands included in E-MBS region is transmitted to a user equipment. In particular, a base station according to the 4th embodiment of the present invention configures a 2nd type zone allocation bitmap.

According to the 2nd or 3rd embodiment, the number of the bits set to 1 in the 2nd type zone allocation bitmap specifies the number of zones allocated to the downlink frequency band irrespective of E-MBS zone or unicast zone. For instance, referring to FIG. 8, since a zone allocation bitmap configured with 00100001 has 2 bits each of which is set to 1, the zone allocation bitmap configured with 00100001 may be able to represent that the downlink frequency band is distributed to 3 (=2+1) zones. In this case, since it is difficult to indicate how many E-MBS zone(s) is included in the 3 zones, information indicating the number of E-MBS zone(s) should be separately signaled to a user equipment or should be determined in advance.

On the other hand, according to the 4th embodiment, the number of bits set to 1 in the 2nd type zone allocation bitmap is determined as indicating the number of E-MBS zone(s) allocated to a downlink frequency band. For instance, referring to FIG. 8, since a zone allocation bitmap configured with 00100001 has 2 bits each of which is set to 1, the zone allocation bitmap configured with 00100001 may be able to represent that 2 E-MBS zones exist on the downlink frequency band.

Moreover, since the 2nd type zone allocation bitmap has the bit number corresponding to the number of subbands included in E-MBS region, the user equipment may be able to know the total number of subbands included in the E-MBS region from a length of the received zone allocation bitmap and may be able to identify the subband allocated to each E-MBS zone from a position of the bit set to 1. Referring to FIG. 8, since each of a 3rd bit and an 8th bit is set to 1, a user equipment having received a zone allocation bitmap configured with 00100001 from a base station may be able to recognize that subbands 1 to 3 are allocated to an E-MBS zone, that subbands 4 to 8 are allocated to another E-MBS zone of a type different from that of the E-MBS zone, and that subbands starting with a subband 9 belong to a unicast zone.

The processor 400b of the base station according to the 4th embodiment of the present invention may be able to configure a 2nd type zone allocation bitmap including bits amounting to the number of subbands included in the E-MBS region. The base station processor 400a may be able to configure the 2nd type zone allocation bitmap to have the toggled bits amounting to the number of E-MBS zones included in an E-MBS region. The base station processor 400b may control the base station transmitter 100b to transmit the 2nd zone allocation bitmap to a user equipment within a coverage of the base station. The base station processor 400b may be able to control the base station transmitter 100b to broadcast/multicast the corresponding E-MBS data via the subband allocated to the E-MBS zone to which the base station belongs. And, the base station processor 400b may be able to control the base station transmitter 100b to transmit the unicast data for a user equipment or a user equipment group having the user equipment via at least one of subbands allocated for unicast.

The receiver 300a of the user equipment within the coverage of the base station receives the 2nd type zone allocation bitmap and then delivers it to the processor 400a of the user equipment. The user equipment processor 400a may obtain a total number of subbands included in the E-MBS region based on a length of the 2nd type zone allocation bitmap and may be able to determine the number of E-MBS zones, to which the E-MBS region is allocated, based on the number of bits set to 1 within the 2nd type zone allocation bitmap or the number of toggled bits within the 2nd type zone allocation bitmap. For instance, if the number of the bits, which are set to 1 or toggled, within the 2nd type zone allocation bitmap is 2, the user equipment processor 400a may be able to determine that the subbands in the E-MBS region are distributed to total 2 E-MBS zones. Moreover, the user equipment processor 400a may be able to determine the subband allocated to each E-MBS zone based on a position of each bit set to 1 in the 2nd type zone allocation bitmap or a position of each toggled bit.

Therefore, the processor 400a of the user equipment may be able to determine whether to receive or detect E-MBS data and/or unicast data for the user equipment on which subband based on the 2nd type zone allocation bitmap. The user equipment processor 400a may be able to control the user equipment receiver 300a to receive the corresponding E-MBS data of the E-MBS zone via the subband(s) allocated to the E-MBS zone from base station(s) of the E-MBS zone with which the user equipment is currently connected. The user equipment processor 400a may be able to control the user equipment receiver 300a to receive unicast data for the user equipment on the subband allocated for the unicast. And, the user equipment processor 400a may be able to detect data of each E-MBS zone and/or unicast data from a plurality of data received by the user equipment receiver 300a based on the corresponding subband(s).

According to the 4th embodiment of the present invention, only using the 2nd type zone allocation bitmap, it may be able to signal the number of E-MBS zones having a downlink frequency band distributed thereto and a frequency resource allocated to each E-MBS zone to a user equipment. Hence, it is advantageous in that the downlink signaling overhead of the 4th embodiment becomes smaller than the downlink signaling overhead of one of the 1st to 3rd embodiments.

The 2nd type zone allocation bitmap according to the 2nd or 3rd embodiment may be configured almost identical to the zone allocation bitmap according to the 4th embodiment except a case that all subbands are allocated for transmission of E-MBS data. Yet, in case that all subbands are used for the transmission of E-MBS data, a last bit of the 2nd type zone allocation bitmap according to the 2nd or 3rd embodiment is set to 0 but a last bit of the 4th type zone allocation bitmap according to the 4th embodiment is set to 1. For instance, assume that a downlink frequency band of 20 MHz is divided into 21 subbands, that the least significant subbands 1 to 3 from among the 21 subbands are allocated to E-MBS zone #1, that the subbands 4 to 8 are allocated to E-MBS zone #2, and that the subbands 9 to 21 are allocated to E-MBS zone #3. According to the 2nd or 3rd embodiment, a base station belonging to at least one of the E-MBS zones #1 to #3 transmits a zone allocation bitmap configured with 001000010000000000000 to a user equipment. Moreover, if the user equipment is not aware of the number of the E-MBS zones, the base station may also transmit information indicating that the number of the E-MBS zones is 3. On the contrary, according to the 4th embodiment, a base station belonging to at least one of the E-MBS zones #1 to #3 transmits a zone allocation bitmap configured with 001000010000000000001 to a user equipment. According to the 4th embodiment, since E-MBS region is implicitly signaled via the number of '1' in the zone allocation bitmap, it may be unnecessary for the base station to separately signal the information indicating the number of E-MBS zones.

Meanwhile, each of the above-described 2nd to 4th embodiments may apply to a case that a prescribed number of subbands are allocated to at least one E-MBS zone by starting with a subband having a highest index. Yet, although a lowest index is always 1 irrespective of a system frequency bandwidth, a highest index varies by depending on the system frequency bandwidth. Hence, when subbands are allocated to E-MBS zone by starting with a subband having a highest index, in order for a user equipment to know what kinds of subbands ranging between a subband having a highest index and a prescribed subband are allocated to an E-MBS zone, a process for giving subband indexes in reverse order may be necessary. Therefore, if E-MBS zone(s) is situated on a side of subbands having lowest index rather than a side of subbands having highest index, it may be advantageous in implementing the embodiments of the present invention.

Although the present invention is described by taking an example of allocating a resource to E-MBS zone by a subband unit, it is apparent that the above-described embodiments are applicable to a case of allocating a resource by a different unit.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Accordingly, the present invention is applicable to a wireless communication system. In particular, the present invention is applicable to a method and apparatus for transmitting a signal in a wireless communication system.

What is claimed is:

1. A method of transmitting, by a base station, MBS (multicast and broadcast service) data in a wireless communication system, comprising:
   transmitting an allocation bitmap for indicating subbands allocated to one or more MBS zones from among a plurality of subbands included in a downlink frequency band;
   transmitting the MBS data via at least one subband allocated to the one or more MBS zones,
   wherein the subbands allocated to the one or more MBS zones are subbands having lowest indexes from among the plurality of subbands; and
   wherein the allocation bitmap includes a plurality of bits, each of which corresponds to two adjacent subbands in the plurality of subbands and indicates whether the two adjacent subbands belong to a same MBS zone.

2. The method of claim 1, wherein the rest of the plurality of subbands except the subbands allocated to the one or more MBS zones is allocated to a unicast zone for unicast data.

3. The method of claim 2, wherein in the allocation bitmap, a bit corresponding to two adjacent subbands allocated to different MBS zones or corresponding to a last subband of the subbands allocated to the one or more MBS zones is set to a 1st value and a bit corresponding to two adjacent subbands allocated to one MBS zone or corresponding to two adjacent subbands allocated to the unicast zone is set to a 2nd value.

4. The method of claim 3, wherein the number of bits set to the 1st value in the allocation bitmap is equal to the number of the MBS zones.

5. The method of claim 3, wherein the number of bits set to the 1st value in the allocation bitmap is smaller by one than a sum of the number of the one or more MBS zones and the number of unicast zone and wherein the base station further transmits information indicating a boundary between the one or more MBS zones and the unicast zone or information indicating the number of the one or more MBS zones.

6. A method of receiving, by a user equipment, MBS (multicast and broadcast service) data in a wireless communication system, comprising:
   receiving, from a base station, an allocation bitmap for indicating subbands allocated to one or more MBS zones from among a plurality of subbands included in a downlink frequency band;
   receiving, from the base station, the MBS data via at least one subband allocated to the one or more MBS zones based on the allocation bitmap,
   wherein the subbands allocated to the one or more MBS zones are subbands having lowest indexes from among the plurality of subbands; and
   wherein the allocation bitmap includes a plurality of bits, each of which corresponds to two adjacent subbands in the plurality of subbands and indicates whether the two adjacent subbands belong to a same MBS zone.

7. The method of claim 6, wherein unicast data is received on the rest of the plurality of subbands except the n-subbands allocated to the one or more MBS zones.

8. The method of claim 7, wherein a bit set to a 1st value in the allocation map indicates two adjacent subbands allocated to different MBS zones or a last subband of then subbands allocated to the one or more MBS zones and wherein a bit set to a 2nd value indicates two adjacent subbands allocated to one MBS zone or two adjacent subbands allocated to the unicast data.

9. The method of claim 8, wherein the number of bits set to the 1st value in the allocation bitmap is equal to the number of the one or more MBS zones.

10. The method of claim 8, wherein the number of bits set to the $1^{st}$ value in the allocation bitmap is smaller by one than a sum of the number of the one or more MBS zones and the number of unicast zone for the unicast data and wherein the user equipment further receives information indicating a boundary between the one or more MBS zones and the unicast zone or information indicating the number of the one or more MBS zone.

11. A base station of transmitting MBS (multicast and broadcast service) data in a wireless communication system, comprising:
a transmitter; and
a processor, connected to the transmitter, configured to control the transmitter to transmit an allocation bitmap for indicating subbands allocated to one or more MBS zones from among plurality of subbands included in a downlink frequency band and configured to control the transmitter to transmit the MBS data via at least one subband allocated to the one or more MBS zones,
wherein the subbands allocated to the one or more MBS zones are subbands having lowest indexes from among the plurality of subbands; and
wherein the allocation bitmap includes a plurality of bits, each of which corresponds to two adjacent subbands in the plurality of subbands and indicates whether the two adjacent subbands belong to a same MBS zone.

12. The base station of claim 11, wherein the processor controls the transmitter to transmit unicast data via the rest of the plurality of subbands except the n-subbands allocated to the one or more MBS zones.

13. The base station of claim 12, wherein the processor is configured to set a bit corresponding to two adjacent subbands allocated to different MBS zones or corresponding to a last subband of the subbands allocated to the one or more MBS zones to a $1^{st}$ value and wherein the processor is configured to set a bit corresponding to two adjacent subbands allocated to one MBS zone or corresponding to two adjacent subbands allocated to the unicast data to a $2^{nd}$ value.

14. The base station of claim 13, wherein the processor is configured to set a last bit of the allocation bitmap to the $1^{st}$ value such that the number of bits set to the $1^{st}$ value in the allocation bitmap is equal to the number of the one or more MBS zones.

15. The base station of claim 13, wherein the processor is configured to set a bit corresponding between two MBS zones or between the one or more MBS zones and a unicast zone for the unicast data to the $1^{st}$ value such that the number of bits set to the $1^{st}$ value in the allocation bitmap is smaller by one than a sum of the number of the one or more MBS zones and the number of the unicast zone and wherein the processor controls the transmitter to further transmit information indicating a boundary between the one or more MBS zones and the unicast zone or information indicating the number of the one or more MBS zones.

16. A user equipment of receiving MBS (multicast and broadcast service) data in a wireless communication system, comprising:
a receiver; and
a processor, connected to the receiver, configured to control the receiver to receive, from a base station, an allocation bitmap for indicating subbands allocated to one or more MBS zones from among a plurality of subbands included in a downlink frequency band, control the receiver to receive, from the base station, the MBS data via at least one subband allocated to the one or more MBS zones based on the allocation bitmap,
wherein the subbands allocated to the one or more MBS zones are subbands having lowest indexes from among the plurality of subbands; and
wherein the allocation bitmap includes a plurality of bits, each of which corresponds to two adjacent subbands in the plurality of subbands and indicates whether the two adjacent subbands belong to a same MBS zone.

17. The user equipment of claim 16, wherein the processor control the receiver to receive unicast data on the rest of the plurality of subbands except the subbands allocated to the one or more MBS zones.

18. The user equipment of claim 17, wherein the processor determines that a bit set to a $1^{st}$ value in the allocation map indicates two adjacent subbands allocated to different MBS zones or a last subband of the subbands allocated to the one or more MBS zones and wherein the processor determines that a bit set to a $2^{nd}$ value indicates two adjacent subbands allocated to one MBS zone or two adjacent subbands allocated to the unicast data.

19. The user equipment of claim 18, wherein the processor determines the number of the one or more MBS zones based on the number of the bits set to the $1^{st}$ value in the allocation bitmap and wherein the number of the bits set to the $1^{st}$ value in the allocation bitmap is equal to the number of the one or more MBS zones.

20. The user equipment of claim 18, wherein the receiver further receives information indicating a boundary between the one or more MBS zones and a unicast zone for the unicast data or information indicating the number of the one or more MBS zones, wherein the processor determines the number of the one or more MBS zones based on the information indicating the boundary or the information indicating the number of the one or more MBS zones and the number of the bits set to the 1st value in the allocation bitmap, and wherein the number of the bits set to the 1st value is smaller by one than a sum of the number of the one or more MBS zones and the number of the unicast zone.

* * * * *